(12) United States Patent
Gong et al.

(10) Patent No.: US 11,625,950 B2
(45) Date of Patent: Apr. 11, 2023

(54) SYSTEM AND METHOD FOR ENHANCING IMAGE RETRIEVAL BY SMART DATA SYNTHESIS

(71) Applicant: Siemens Aktiengesellschaft, Munich (DE)

(72) Inventors: Yunye Gong, West Windsor, NY (US); Srikrishna Karanam, Plainsboro, NJ (US); Ziyan Wu, Princeton, NJ (US); Kuan-Chuan Peng, Plainsboro, NJ (US); Jan Ernst, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 31 days.

(21) Appl. No.: 16/755,998

(22) PCT Filed: Oct. 23, 2018

(86) PCT No.: PCT/US2018/056981
§ 371 (c)(1),
(2) Date: Apr. 14, 2020

(87) PCT Pub. No.: WO2019/083919
PCT Pub. Date: May 2, 2019

(65) Prior Publication Data
US 2020/0242340 A1 Jul. 30, 2020

Related U.S. Application Data

(60) Provisional application No. 62/576,306, filed on Oct. 24, 2017.

(51) Int. Cl.
*G06V 40/16* (2022.01)
*G06F 16/532* (2019.01)
*G06K 9/62* (2022.01)

(52) U.S. Cl.
CPC .......... *G06V 40/172* (2022.01); *G06F 16/532* (2019.01); *G06K 9/6231* (2013.01); *G06K 9/6256* (2013.01)

(58) Field of Classification Search
CPC ............. G06K 9/00288; G06K 9/6231; G06K 9/6256; G06F 16/532
See application file for complete search history.

(56) References Cited

U.S. PATENT DOCUMENTS

2003/0108334 A1* 6/2003 Nevenka ............... G06F 16/786
386/224
2016/0275079 A1* 9/2016 Kluckner ............... G06F 30/00

OTHER PUBLICATIONS

Kim et al., "Learning to Discover Cross-Domain Relations with Generative Adversarial Networks", Proc. of the 34th Intel. Conf. on Machine Learning, Aug. 11, 2017 (Year: 2017).*

(Continued)

*Primary Examiner* — Ruiping Li (57) ABSTRACT

A method for enhancing facial/object recognition includes receiving a query image, and providing a database of object images, including images relevant to the query image, each image having a first attribute and a second attribute with each of the first attribute and the second attribute having a first state and a second state. The method also includes creating an augmented database by generating a plurality of artificial images for each image in the database, the artificial images cooperating with the image to define a set of images including every combination of the first attribute and the second attribute in each of the first state and the second state, and comparing the query image to the images in the augmented database to find one or more matches.

7 Claims, 4 Drawing Sheets

(56) References Cited

OTHER PUBLICATIONS

Xi Chen et al., "InfoGAN: Interpretable Represenetation Learning by Information Maximizing Generative Adversarial Nets", Proceedings of the 30th International Conference on Neural Information Processing Systems, Dec. 5, 2016, Retrieved from the Internet: URL:https://papers.nips.cc/paper/6399-infogan-interpretable-reprsentation-learning-by-information-maximizing-generative-adversarial-nets.pdf [retrieved on Jan. 15, 2019], pp. 2180-2188.

Ramakrishna Vedantam et al: "Generative Models of Visually Grounded Imagination", Jul. 18, 2017, Retrieved from the Internet: URL:https://arxiv.org/pdf/1705.10762.pdf [retrieved on Jan. 15, 2019], pp. 1-25.

Wen Gao et al., "Virtual face image generation for illumination and pose insensitive face recognition", Proceedings of the 2003 International Conference on Multimedia and Expo, Jul. 6-9, 2003, Baltimore, MD, US, IEEE Operations Center, Jul. 6, 2003, vol. 3, pp. III-149-III-152.

Jun-Yan Zhu et al., "Unpaired Image-to-Image Translation using Cycle-Consistent Adversarial Networks", arxiv.org, Cornell University Library, Cornell University, Ithaca, NY, Mar. 30, 2017, pp. 1-18.

Gong Yunye et al, "Learning Compositional Visual Concepts with Mutual Consistnecy", 2018 IEEE/CVF Conference on Computer Vision and Pattern Recognition, IEEE, Jun. 18, 2018, pp. 8659-8668.

PCT International Search Report and Written Opinion of International Searching Authority dated Jan. 24, 2019 corresponding to PCT International Application No. PCT/US2018/056981 filed Oct. 23, 2018.

* cited by examiner

SYSTEM AND METHOD FOR ENHANCING IMAGE RETRIEVAL BY SMART DATA SYNTHESIS

TECHNICAL FIELD

The present disclosure is directed, in general, to a system and method for improving image retrieval, and more specifically to a system and method to enhance the performance and accuracy of image retrieval.

BACKGROUND

Image retrieval is used to identify an object or person from an image by searching a pre-existing database for similar images. This activity is typically referred to as object recognition, facial recognition, and the like. Given a query image, a typical approach to perform image retrieval is to search for the query image in an existing database of images. The search is performed in a feature space learned with annotated training data using convolutional neural networks. In many applications in object recognition, the entity/object being searched may have very few or even a single image in the database being searched. With only one, or very few potential "hits" within the database, performance can be slow and inaccurate.

SUMMARY

A method for enhancing facial/object recognition includes receiving a query image, and providing a database of object images, including images relevant to the query image, each image having a first attribute and a second attribute with each of the first attribute and the second attribute having a first state and a second state. The method also includes creating an augmented database by generating a plurality of artificial images for each image in the database, the artificial images cooperating with the image to define a set of images including every combination of the first attribute and the second attribute in each of the first state and the second state, and comparing the query image to the images in the augmented database to find one or more matches.

In another construction, a method for enhancing facial/object recognition includes receiving a query image, and providing a database of object images, including images relevant to the query image, each image having a first attribute and a second attribute with each of the first attribute and the second attribute having a first state and a second state. The method also includes providing a series of training images wherein the series includes sets of three images with each image falling within a unique image domain and each image domain representing a possible combination of the first attribute and the second attribute with a first image domain including the first attribute and the second attribute in the first state (X=0, Y=0), a second image domain including the first attribute in the second state and the second attribute in the first state (X=1, Y=0), and a third image domain including the first attribute in the first state and the second attribute in the second state (X=0, Y=1). The method further includes developing forward generators and reverse generators between the first image domain, the second image domain, the third image domain, and a fourth image domain for which no training image is provided, applying the forward generators and reverse generators to single images within the database that fall within one of the first image domain, the second image domain, the third image domain, and a fourth image domain to generate images for the remaining domains to generate an augmented database, and comparing the query image to the images in the augmented database to find one or more matches.

In another construction, a computer-implemented method for enhancing facial/object recognition includes receiving a query image in a computer, providing a database of object images in the computer, including images relevant to the query image, each image having at least two attributes with each attribute having at least two possible states, and creating an augmented database in the computer by generating a plurality of artificial images for each image in the database using an image generator, the artificial images cooperating with the image to define a set of images including every combination of the at least two attributes in each of the at least two states. The method further includes generating pseudo query images from the query image using the image generator, and comparing the pseudo images and the query image to the images in the augmented database to find one or more matches.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

The performance of existing image retrieval algorithms can be improved if more data, i.e., more images per object class are available for searching. However, it is difficult to automatically generate more data given constraints that these synthesized images need to be semantically meaningful.

Figure 6:
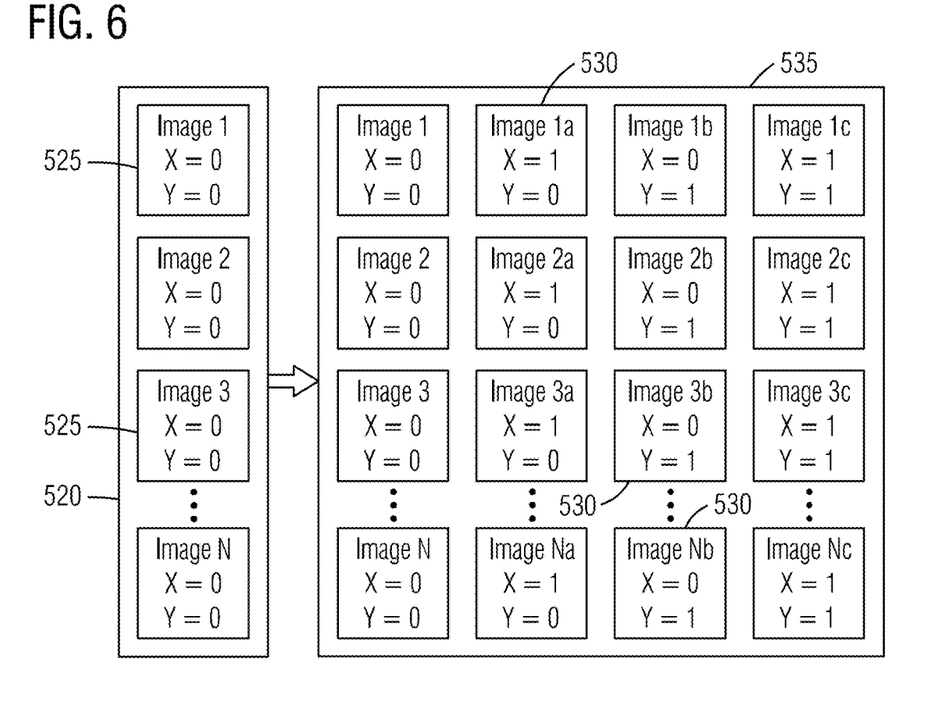
FIG. 6 is a schematic illustration of the formation of an augmented database

Using smart data synthesis, synthetically generated data samples, as a composition of learned concepts, are used for improved image retrieval. Specifically, and as will be discussed in greater detail below, a database of faces or objects to be searched is augmented through the creation of additional semantically meaningful images as schematically illustrated in FIG. 6. Each image in the database includes at least two attributes (e.g., eyeglasses, hairstyles, hair color, eye color, hats, skin color, object reflectivity, object color, shape of an object, object features such as threads, holes, pins, and the like, etc.) with each attribute including at least two states. Thus, in a simple example where an image includes two attributes with both attributes in a first state, three additional images are available (i.e., first attribute in the first state, second attribute in the second state, first attribute in the second state, second attribute in the first state, first attribute in the second state, and second attribute in the second state). These three images can be generated for each image in the database to provide an augmented database to be searched.

In a face verification application, two face images may be provided with the goal being to determine if the two images represent the same person. To enhance the accuracy and speed of the analysis, new images can be generated to represent different states or domains of the image. For example, given a face image of a person with eyeglasses, new images of that person without eyeglasses or with other attributes such as "no hair", "smiling", "with headscarf" and so on can be generated. The newly generated images or data samples are added to the database to produce the augmented database that can be searched.

Figure 7:
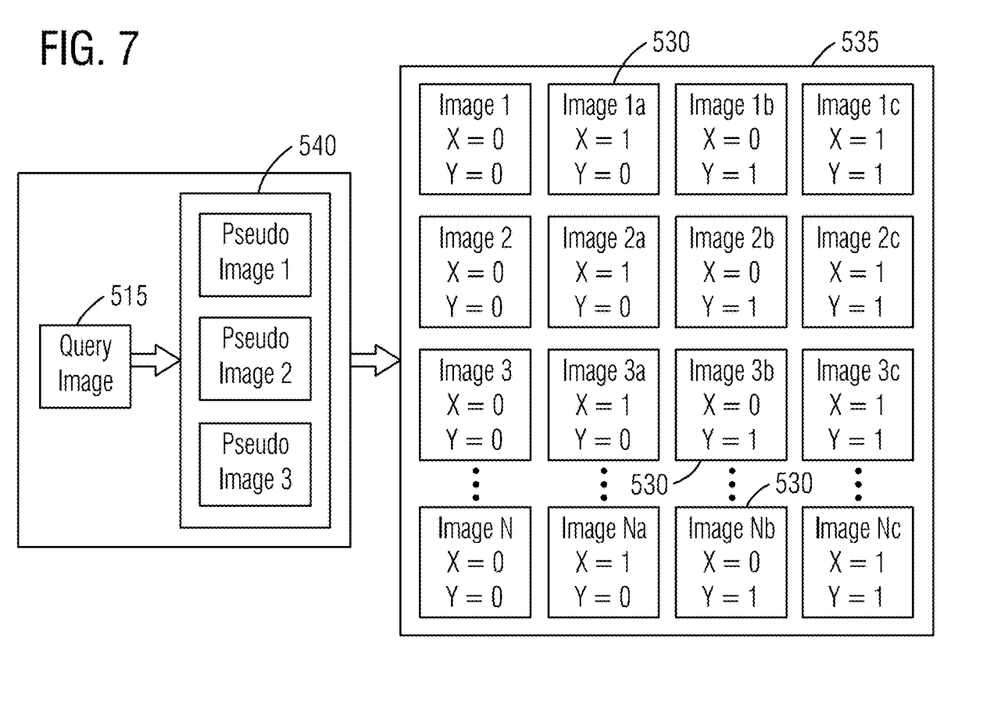
FIG. 7 is a schematic illustration of the generation of pseudo images from a query image.

To further enhance the retrieval of matching images or the confirmation of a match in a facial or object recognition system, the query image or the image being searched can be used to generate pseudo images as illustrated in FIG. 7 with the pseudo images and the query image all being searched simultaneously. The query image, like the images in the database includes a plurality of attributes with each attribute having at least two possible states. The pseudo images are generated from the query images using the same techniques used to generate the augmented database. Having images that represent multiple states enhances the likelihood of a successful search and the finding of one or more matches.

FIGS. 1-5 and the associated discussion describe a process for automatically generating semantically plausible images such as those used to create the augmented database and the pseudo images.

As an overview, before any images can be generated, the system must first "learn" how to generate the images. Typically, a database of images including complete sets of images (i.e. images showing object in each possible state) are used to train the system.

Figure 1:
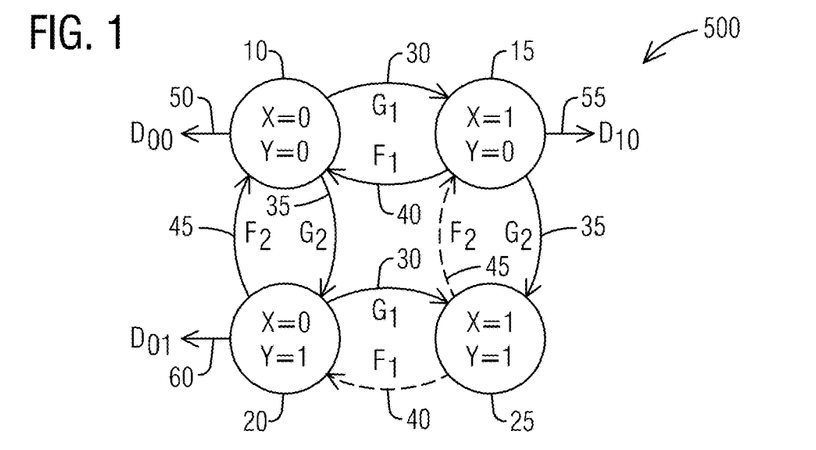
FIG. 1 is a graphical representation of a multi-concept learning system in which the number of concepts equals two (n=2).

FIG. 1 represents one possible example in which multiple concepts or attributes (referred to generally as "X" and "Y") are learned simultaneously to develop data that is otherwise unavailable. The newly developed data can be used to complete the augmented database or can be used for other purposes. In FIG. 1, each of four corner elements represents a domain 10, 15, 20, 25. Each domain 10, 15, 20, 25 is an image or piece of data that includes one or more concepts (X, Y). A concept (X, Y) is simply an attribute of the image or piece of data. For purposes of discussion an example of a facial image will be used throughout the description. In the example, two concepts (X, Y) will be learned with the first concept (X) being "no smile" or "a smile" and the second concept (Y) being "no glasses" or "with glasses". In FIG. 1, the concepts are labeled X and Y with the values of X=0 representing no smile, X=1 representing a smile, Y=0 representing no glasses, and Y=1 representing glasses. The first domain 10 (X=0, Y=0) represents a facial image in which there is no smile and no glasses. The second domain 15 (X=1, Y=0) represents a facial image in which there is a smile and no glasses. The third domain 20 (X=0, Y=1) represents a facial image in which there is no smile but there are glasses. In the example of FIG. 1, the first three domains 10, 15, 20 include available data. The fourth domain 25 (X=1, Y=1) represents a facial image in which there is a smile and there are glasses. The fourth domain 25 includes data that is not available, but rather is generated as will be described in greater detail.

With continued reference to FIG. 1, four generators 30, 35, 40, 45 are employed to generate data. The four generators include a first generator 30 ($G_1$) that starts with an image with a first concept value of X=0 and generates a new image where X=1. A second generator 35 ($G_2$) starts with an image with a second concept value of Y=0 and generates a new image where Y=1. A third generator 40 ($F_1$) starts with an image with a first concept value of X=1 and generates a new image where X=0. This is essentially the reverse of the first generator 30. A fourth generator 45 ($F_2$) starts with an image with a second concept value of Y=1 and generates a new image where Y=0. As with the third generator 40, the fourth generator 45 is essentially the reverse of the second generator 35. With the four generators 30, 35, 40, 45, the computer is able to generate images in any domain 10, 15, 20, 25 based on a single image from one of the domains 10, 15, 20, 25. Thus, the four generators 30, 35, 40, 45 cooperate to define an image generator 500.

However, the generators 30, 35, 40, 45 must be "learned" or developed to produce accurate and meaningful results. To complete the learning process, the system includes three discriminators 50, 55, 60 associated with the domains 10, 15, 20 for which known data exists. The first discriminator 50 is associated with the first domain 10 in which both X and Y equal zero ($D_{00}$). The second discriminator 55 is associated with the second domain 15 in which X=1 and Y=0 ($D_{10}$). The third discriminator 60 is associated with the third domain 20 in which X=0 and Y=1 ($D_{01}$). Each discriminator 50, 55, 60 operates to analyze images to determine if the image is a real image or if it was generated using one of the four generators 30, 35, 40, 45. Using an iterative or cyclic process, the generators 30, 35, 40, 45 are adjusted until the discriminators 50, 55, 60 can no longer determine which images are generated by the generators 30, 35, 40, 45 and which images are actual data. At this point, the generators 30, 35, 40, 45 have been optimized and the discriminators 50, 55, 60 can be discarded.

As noted, the first three domains 10, 15, 20 in this example contain known or available data. In this example, celebrity photos containing the necessary data are readily available. This known data is used to develop the four generators 30, 35, 40, 45 using the discriminators 50, 55, 60. Once the four generators 30, 35, 40, 45 are completed, the discriminators 50, 55, 60 are no longer needed, and any domain image can be used to generate the remaining three domains 30, 35, 40, 45, thereby allowing for the population of a database with only minimal starting data.

Figure 3:
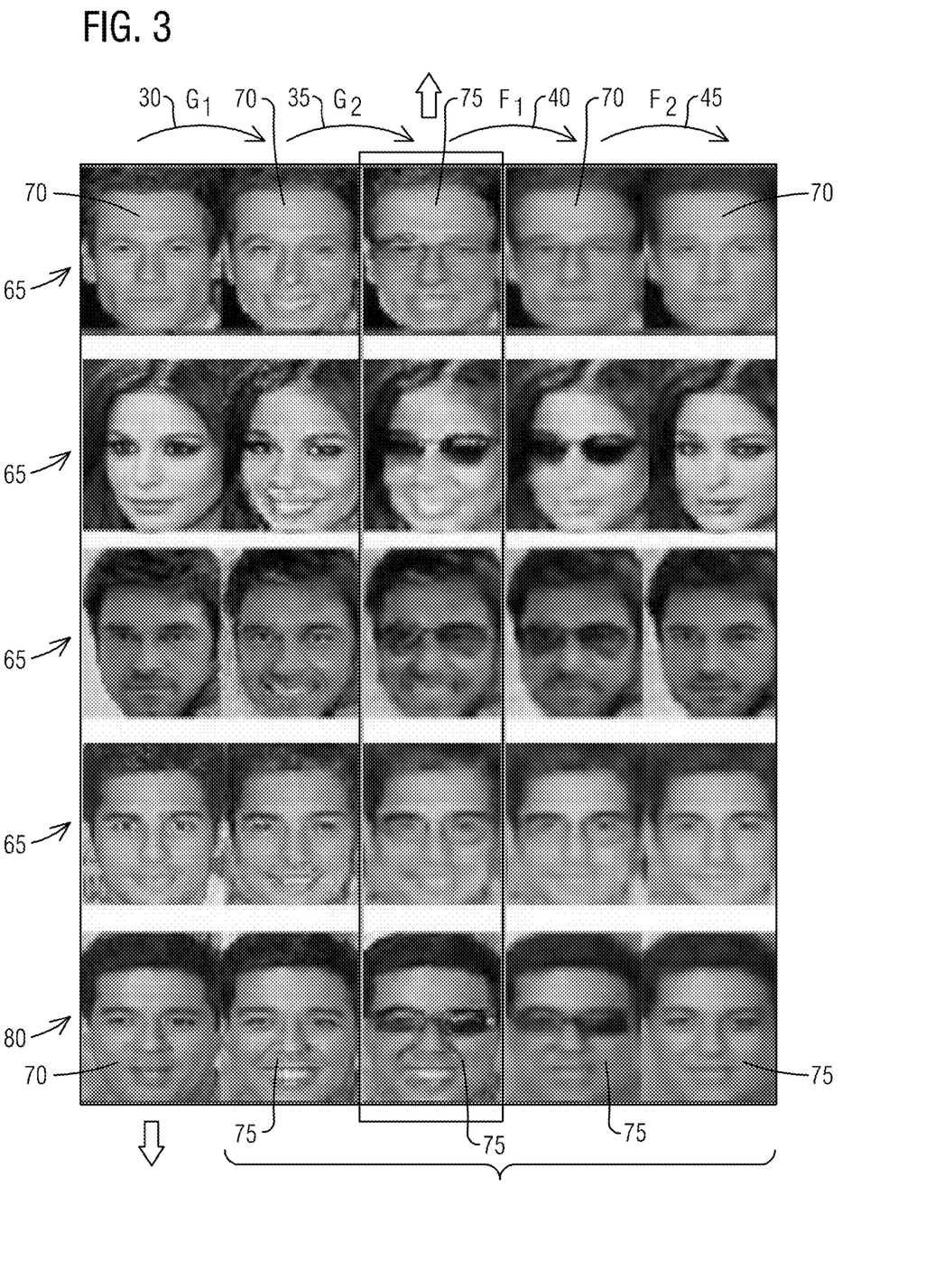
FIG. 3 is a partial showing of data used to train the learning system of FIG. 1.

FIG. 3 illustrates sample data that can be used to optimize the generators 30, 35, 40, 45. The first four rows 65 include four available images 70 (the first two and the last two) representing the four domains 30, 35, 40, 45 for two concepts (X, Y) to be learned and one unavailable image 75 (the middle image) which represents the joint concept space (i.e., X=1, Y=1). These first four rows 65 are used to create and optimize the generators 30, 35, 40, 45 between the four domains 10, 15, 20, 25. The final row 80 in FIG. 3 includes a single available image 70 (the first image) and four synthetic or generated images 75.

Figure 2:
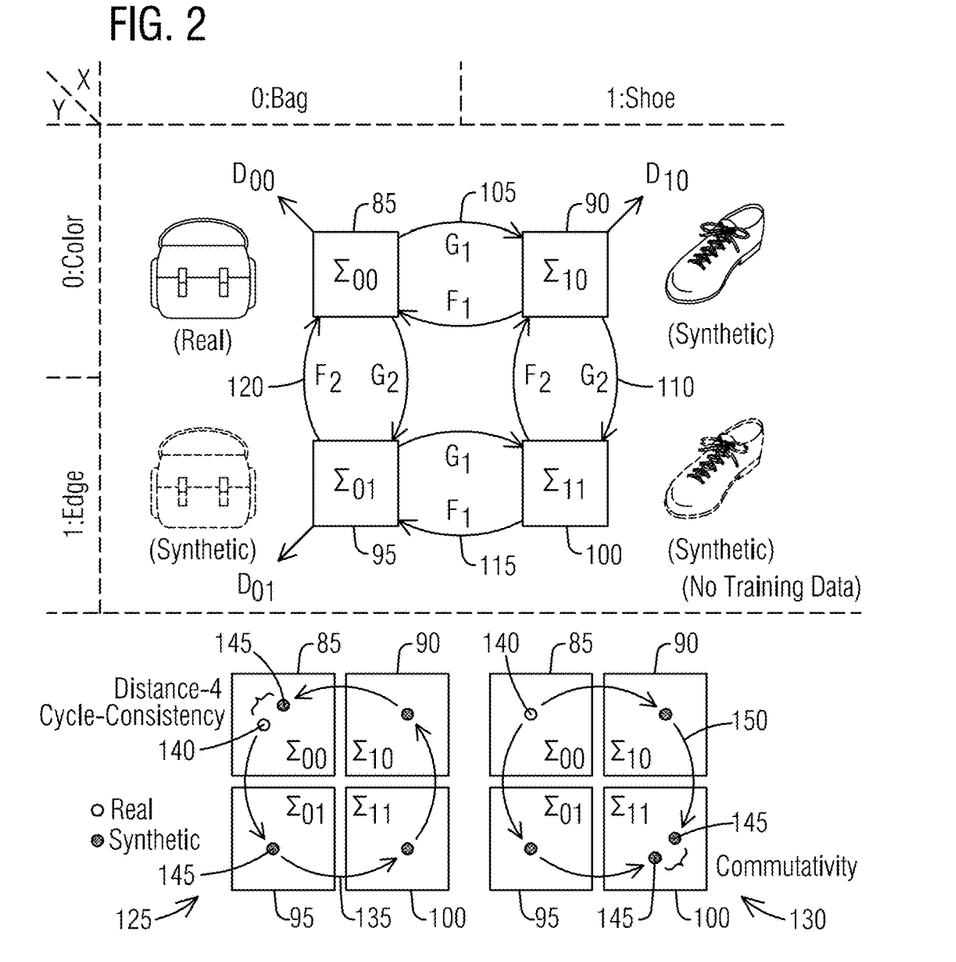
FIG. 2 is a graphical representation of a multi-concept learning system for two different concepts than those of FIG. 1.

FIG. 2 illustrates another example in which the concepts (X, Y) are unrelated to a face and rather relate to a type of object (i.e., a bag or a shoe) and texture of the image (i.e., a color image represented as solid lines, or a line drawing represented by broken lines). The same technique and process described with regard to FIG. 1 is applied to the domains 85, 90, 95, 100 of FIG. 2 to develop the four generators 105, 110, 115, 120 and allow for the population of a database or the generation of additional domain data. Given sufficient training data, translation from an image of a textured handbag 85 to a corresponding visually convincing image of a shoe with the same texture 90, or from a color image of a handbag 85 to a consistent line drawing of a handbag 95 is possible.

FIG. 2 also includes a pair of charts 125, 130 that illustrate the cyclic consistency that is enforced to achieve the desired results. During the development of the generators 105, 110, 115, 120 and after they are complete, two general forms of cyclic consistency are enforced. The first cyclic consistency 135 requires starting with one image 140 in a domain 85, 90, 95, 100 (can start at any domain 85, 90, 95, 100) and using the generators 105, 110, 115, 120 to create images 145 in the other domains 85, 90, 95, 100 moving in a circle (clockwise or counterclockwise) including the domain 85, 90, 95, 100 in which the process started. In that starting domain 85, 90, 95, 100, the original image 140 and the synthetic image 145 should be so similar that the discriminators 50, 55, 60 cannot tell which image 140, 145 is synthetic. The second form of cyclic consistency 150 starts with an actual image 140 in one of the domains 85, 90, 95, 100. Synthetic images 145 are generated in each of the adjacent domains 85, 90, 95, 100 and then two different synthetic images 145 are generated for the opposite domain 85, 90, 95, 100. Thus, a synthetic image 145 is generated for the domain 85, 90, 95, 100 opposite the starting domain 85, 90, 95, 100 from both the clockwise and counterclockwise directions. These two images 145 should be so similar that the discriminators 50, 55, 60 cannot distinguish them from one another or from the real images 140.

Figure 4:
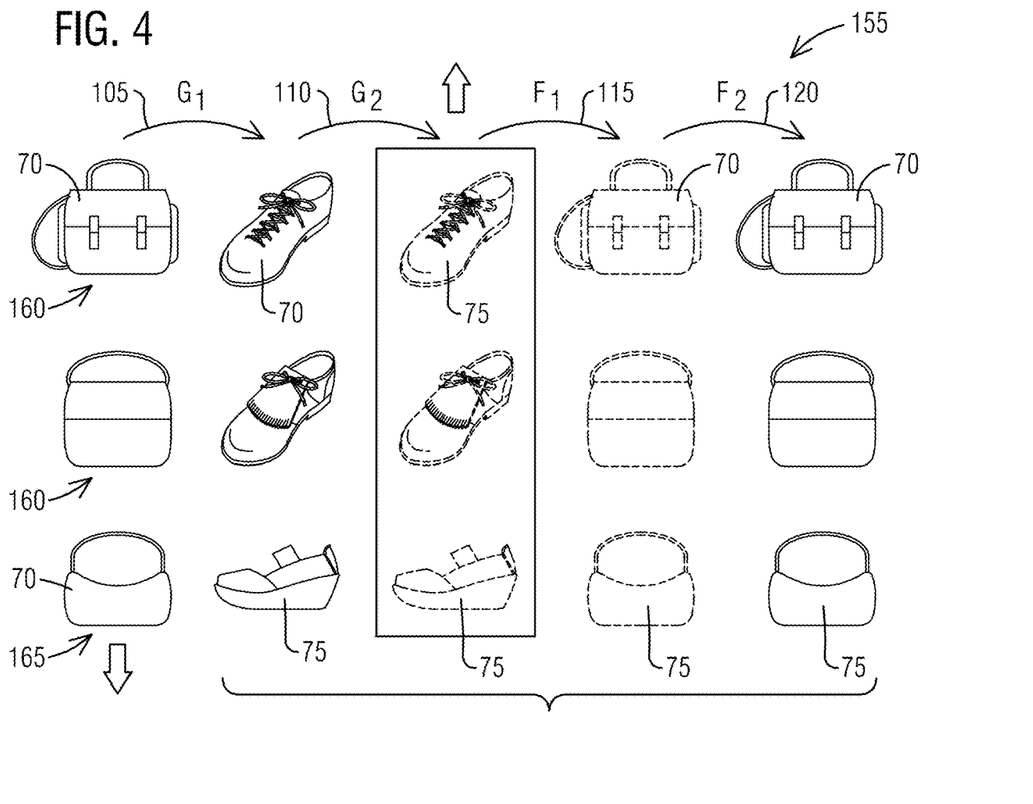
FIG. 4 is a partial showing of data used to train the learning system of FIG. 2.

FIG. 4 illustrates another set of sample data 155 that could be used to develop the generators 105, 110, 115, 120 of the example of FIG. 2. In FIG. 4, the first two rows 160 of data include sample data for which four of the five images are available images 70. The final row 165 includes data for which a single image is an available image 70 and the remaining four images are synthetic or generated images 75. It is important to note that significantly more sample data than two or three rows is required to complete the generators 105, 110, 115, 120. Thus, the example data herein, describes a small portion of the necessary data.

Figure 5:
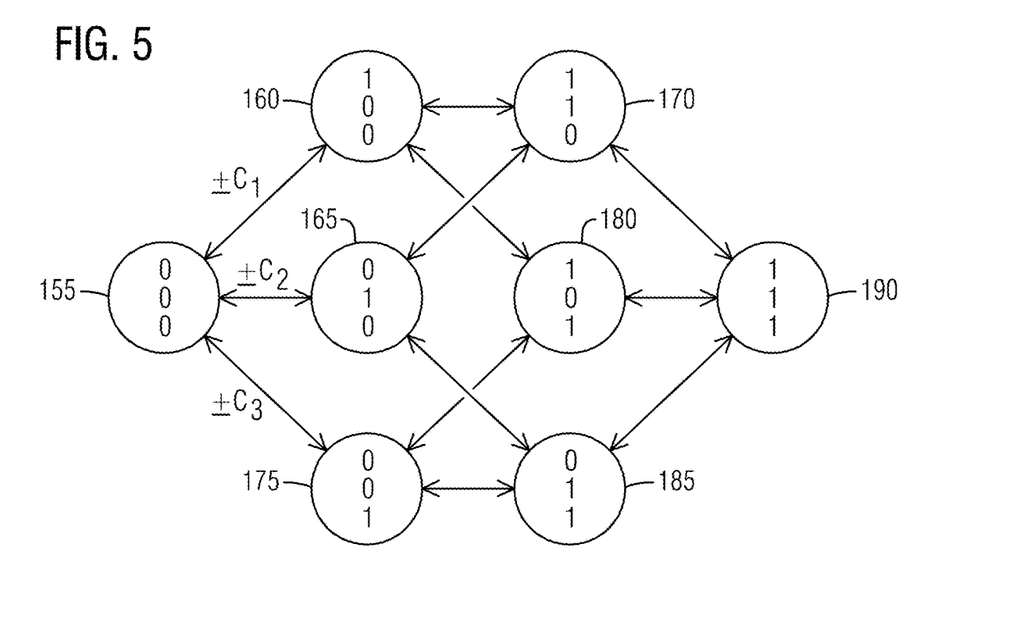
FIG. 5 is a graphical representation of a multi-concept learning system in which the number of concepts equals three (n=3).

While the foregoing examples describe learning two concepts (X, Y) simultaneously, FIG. 5 schematically illustrates how three concepts (X, Y, Z) could be learned simultaneously. When three concepts are involved, eight different nodes or domains 155, 160, 165, 170, 175, 180, 185, 190 will exist. The domains 155, 160, 165, 170, 175, 180, 185, 190 include a first set of domains 155, 160, 165, 170 that are the same as those of the example of FIG. 1 with a third concept, Z equal to zero and another set of domains 175,

180, 185, 190 that are the same as those of the example of FIG. 1 with the third concept, Z equal to one.

The same process is used with three concepts with cyclic consistency maintained in both directions for four loops rather than one loop as with the example of FIG. 1. The additional loops require additional generators that need to be optimized using additional discriminators. As one or ordinary skill will realize, additional concepts could be learned simultaneously but as is clear, the level of complexity increases rapidly.

FIG. 5 presents the results of directly composing three concepts (X, Y, Z) learned in two separate experiments described above. Synthetic images are generated in the domain with labels (with smile, with eyeglasses, with bangs, i.e. X=1, Y=1, Z=1) where no training data is available in either experiment. It is clear that the proposed method can be generalized to manipulation over higher dimensional latent spaces.

It should also be clear that learned concepts (X, Y, Z) are readily transferable to different datasets, including datasets that were not used during the training or learning phase.

As discussed with regard to FIG. 5, it is possible to scale up to three (or more) concepts. In fact, the foregoing method can be applied to "n" concepts under two assumptions, first the concepts must have distinct states, i.e. they are not continuous, and second, activating one concept cannot inhibit the other. Pairwise constraints over two concepts are sufficient for generating samplers from all concept combinations. FIG. 5 illustrates and example with n=3. As with the n=2 examples, each domain may include available data or data that must be generated. Generalizing to n>3, new layers of domains are added in order of their distance from any observed domain.

Given a pair of face images, face verification is the problem of determining whether the pair represents the same person. To apply the present method, a user begins with the one-shot version where every person in the probe and the gallery has exactly one image each. The learned concept mappings (i.e., generators 30, 35, 40, 45) are then applied to synthesize new, unseen face images, transforming the one-shot version to multi-shot images. By performing this conversion with the synthesized images, the face verification performance is improved.

Converting the one-shot face verification problem to a multi-shot one produces results that consistently outperform the corresponding one-shot results. These results, complemented by qualitative evaluations, provide evidence for the transferability of the learned concepts to new datasets, demonstrating promise in learning the underlying latent space information.

The foregoing techniques enhance image retrieval performance and can be applied to multiple use-cases. For example, as discussed above, the performance of a face verification system is greatly enhanced using these techniques.

In a face verification application, a query image 515 of a person is provided as illustrated in FIG. 7. A database of images 520 exists and is augmented using the techniques discussed above and as shown in FIG. 6. Specifically, each image 525 in the database 520 represents a person. Each image 525 may have multiple attributes (labeled "X" and "Y") that can have multiple states (X=0, X=1, Y=0, Y=1) but each image 525 falls in one domain (i.e., each attribute has a particular state). The foregoing technique generates additional images 530 of the person in different domains (i.e., with attributes in different states). These images 530 are then combined with the images 525 in the database 520 to produce an augmented database 535 (FIG. 6).

FIG. 6 illustrates a simplified example of how the foregoing techniques are used to create the augmented database 535. Each image 525 in the original database 520 has two attributes (labeled X and Y) with each attribute capable of having one of two states (i.e., X=0, X=1, Y=0, Y=1). In the example, all the images 525 have the same state for both attributes, but this is not necessary as an image 525 with any combination of states can be used to generate the additional images 530.

The generators 30, 35, 40, 45 are used to generate the additional images 530 having the state combinations not present in the original image 520. In the example of FIG. 6 this results in three additional images 530 for each existing image 520.

Using similar techniques, the query image 515 can be used to generate a number of pseudo images 540 as shown in FIG. 7. The pseudo images 540 show the person in the query image 515 with different attributes such that each pseudo image 540 represents a unique state.

The query image 515 and the pseudo images 540 are simultaneously searched in the augmented database 535 to improve the accuracy of the search as well as the speed of the search. While this example referred to facial images and face verification, the same process can be used for person identification. In this case, the images 515, 525, 530, 540 include the entire person rather than just the face.

In yet another example, the system can be applied to object identification or image retrieval. Facial recognition or face verification are specific examples of object recognition. As with the special case of facial recognition, a database of relevant objects 520 is provided. Each image in the database 520 includes objects in a fixed state with multiple other states being possible. The system generates those additional state images 530 to populate the augmented database 535.

In one system, the objects are parts provided by a specific manufacturer. The database 520 therefore, includes images 525 of the manufacturer's parts as these would be relevant. The database 520 is augmented to include different images 530 of the parts with varying attributes (e.g., part color, reflectivity, material, etc.).

The query image 515 might be an image of a customer's worn part. The system uses the query image 515 to generate the pseudo images 540 and then searches the query image 515 and the pseudo images 540 in the augmented database 535 to identify the part.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A computer-implemented method for enhancing facial/object recognition, the method comprising:
   receiving a query image in a computer;
   providing a database of object images in the computer, including images relevant to the query image, each image having at least two attributes of a plurality of attributes with each attribute having at least two possible states;

providing a series of training images to the computer to learn two attributes (X, Y) simultaneously, wherein the series includes sets of images with each image falling within a unique image domain with a first image domain including a first attribute of the plurality of attributes and the second attribute of the plurality of attributes in a first state (X=0, Y=0), a second image domain including the first attribute in a second state and the second attribute in the first state (X=1, Y=0), and a third image domain including the first attribute in the first state and the second attribute in the second state (X=0, Y=1);

developing forward generators and reverse generators between the first image domain and the second image domain, between the second image domain and the third image domain, between the third image domain and the fourth image domain, and between the fourth image domain and the first image domain, wherein the fourth image domain has no training image is provided;

applying the forward generators and reverse generators to single images within the database that fall within one of the first image domain, the second image domain, and the third image domain to generate a plurality of artificial images, wherein a first set of four artificial images, one from each domain, are generated from one single image by moving in a circle from a starting domain to each of the other domains and returning to the starting domain, and a second set of two artificial images are generated in a domain opposite of the starting domain by moving in a clockwise direction for a first artificial image and by moving in a counterclockwise direction for a second artificial image;

enforcing a first cyclic consistency between each single image the artificial image of the starting domain by using a first discriminator;

enforcing a second cyclic consistency between images of the second set of artificial images using each single image and the artificial image of a domain opposite of the starting domain in the circle by using a second discriminator;

creating an augmented database in the computer using the plurality of artificial images for each image in the database, the artificial images cooperating with the single images to define a set of images including every combination of the at least two attributes in each of the at least two states;

generating pseudo query images from the query image using the forward and reverse generators; and comparing the pseudo query images and the query image to the images in the augmented database to find one or more matches.

2. The method of claim 1, further comprising:

developing a first forward generator ($G_1$) that transitions the first attribute from the first state to the second state;

developing a second forward generator ($G_2$) that transitions the second attribute from the first state to the second state;

developing a first reverse generator ($F_1$) that transitions the first attribute from the second state to the first state; and developing a second reverse generator ($F_2$) that transitions the second attribute from the second state to the first state.

3. The method of claim 2, further comprising using the image generator to generate a fourth image domain including the first attribute in the second state and the second attribute in the second state (X=1, Y=1).

4. The method of claim 2, wherein the creating an augmented database step includes generating additional images using the image generator.

5. A non-transitory computer-readable medium storing instructions which, when the program is executed by a computer, cause the computer to carry out the method of claim 1.

6. The method of claim 2, further comprising optimizing the first forward generator, the second forward generator, the first reverse generator, and the second reverse generator using a portion of the series of training images, the optimized first forward generator, the second forward generator, the first reverse generator, and the second reverse generator defining an image generator.

7. The method of claim 1, wherein the query image includes an image of a person's face.

* * * * *